United States Patent [19]

Hashemi et al.

[11] Patent Number: 5,383,950
[45] Date of Patent: Jan. 24, 1995

[54] APPARATUS FOR SUPPORTING A GLASS SHEET DURING A TEMPERING PROCESS

[75] Inventors: Amin H. Hashemi, Farmington Hills; Robert A. Hill, Melvindale, both of Mich.

[73] Assignee: Ford Motor Company, Dearborn, Mich.

[21] Appl. No.: 130,928

[22] Filed: Oct. 4, 1993

[51] Int. Cl.$^6$ .............................................. C03B 27/044
[52] U.S. Cl. ........................................ 65/348; 65/288; 65/374.11
[58] Field of Search ............... 65/348, 288, 374.11, 65/374.12

[56] References Cited

U.S. PATENT DOCUMENTS

| | | | |
|---|---|---|---|
| 2,297,315 | 9/1942 | Owen . | |
| 2,551,606 | 5/1951 | Jendrisak . | |
| 2,683,334 | 7/1954 | Rugg et al. . | |
| 3,310,273 | 3/1967 | Seymour | 248/346 |
| 3,586,492 | 6/1971 | McMaster | 65/287 |
| 3,713,798 | 1/1973 | Stilley et al. | 65/106 |
| 3,741,743 | 6/1973 | Seymour | 65/287 |
| 3,837,833 | 9/1974 | Couture et al. | 65/288 |
| 3,973,943 | 8/1976 | Seymour | 65/348 |
| 4,390,359 | 6/1983 | Reunamaki | 65/114 |
| 4,437,871 | 3/1984 | McMaster | 65/104 |
| 4,470,837 | 9/1984 | Seymour | 65/291 |
| 4,556,408 | 12/1985 | Fecik et al. | 65/289 |
| 4,606,749 | 8/1986 | Nushi et al. | 65/106 |
| 4,661,142 | 4/1987 | Bartusel et al. | 65/348 |
| 4,749,399 | 6/1988 | Yamada et al. | 65/273 |
| 4,753,669 | 6/1988 | Reese | 65/273 |
| 4,906,271 | 3/1990 | D'Iribarne et al. | 65/273 |
| 5,069,703 | 12/1991 | d'Iribarne et al. | 65/104 |
| 5,118,335 | 6/1992 | Claassen et al. | 65/348 |
| 5,139,552 | 8/1992 | Yoshizawa et al. | 65/348 |

*Primary Examiner*—Joye L. Woodard
*Attorney, Agent, or Firm*—Lorraine S. Melotik; Roger L. May

[57] ABSTRACT

An apparatus for supporting a glass sheet during a tempering process is provided in which a truss ring structure having a hot/cold ring and a plurality of shaped fingers having converging diagonal sides extending from the hot/cold ring supports the glass sheet. The apparatus further includes cushioning means which may include at least one layer of a composite mesh cloth, a fiberglass tube, or both. In a preferred arrangement, the composite mesh cloth is folded around the fiberglass tube and the shaped fingers to provide optimum cushion and quench air flow to the glass.

21 Claims, 5 Drawing Sheets

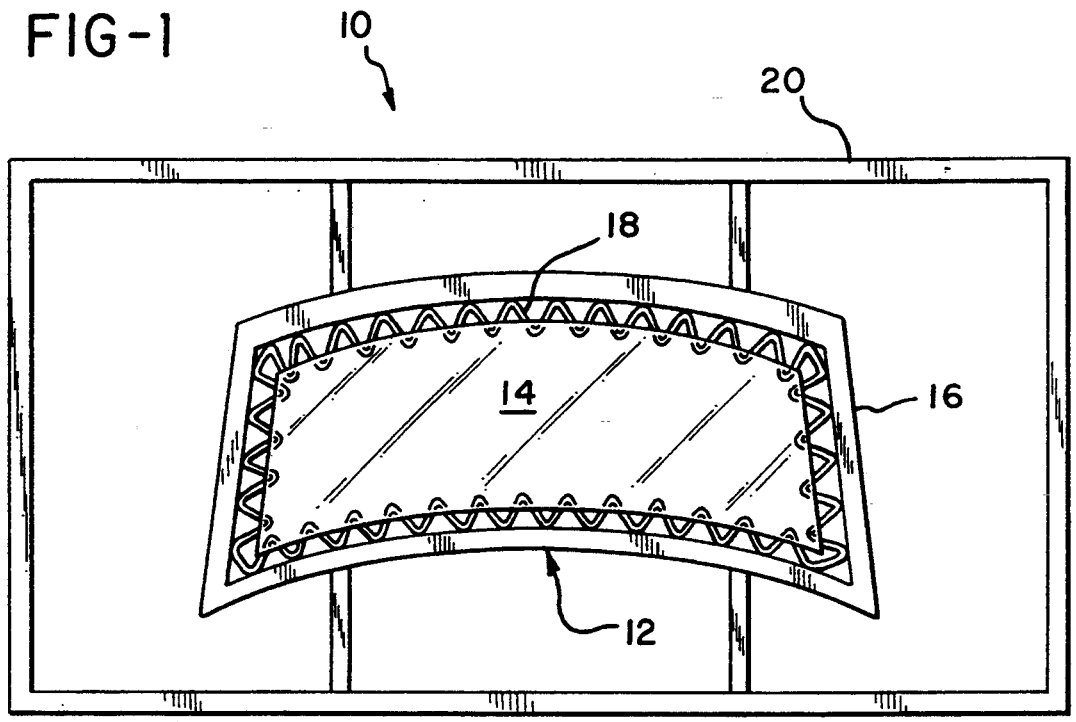
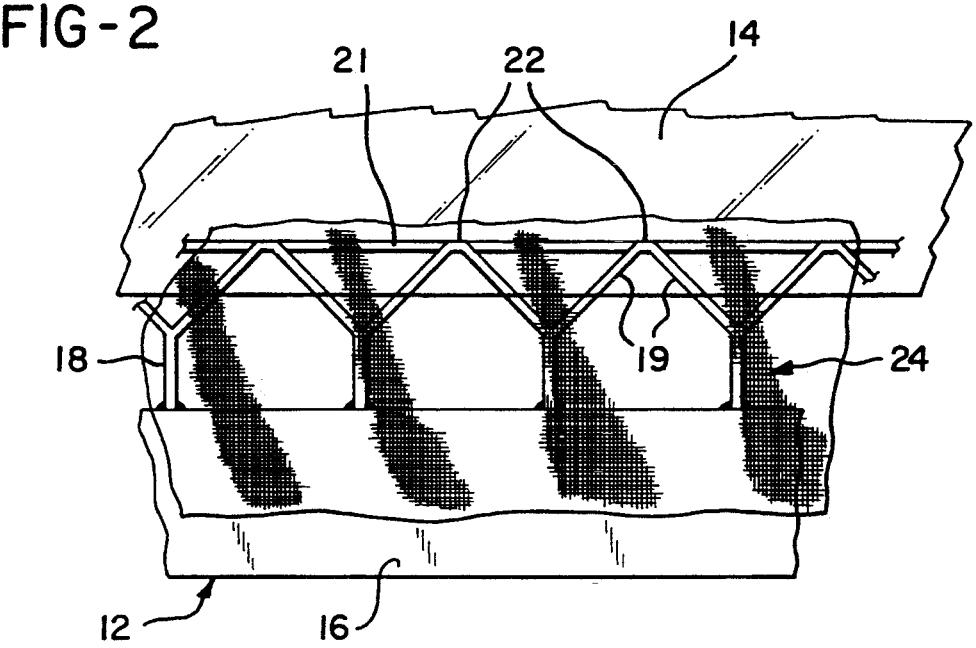

FIG-3
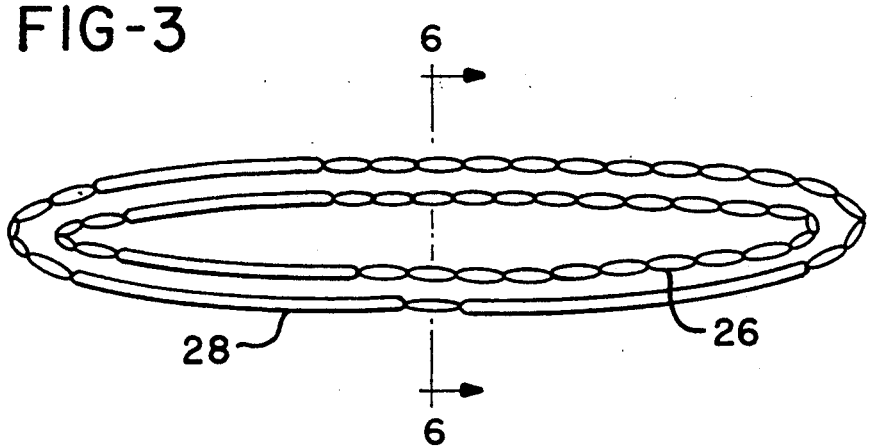
FIG-3A
FIG-4
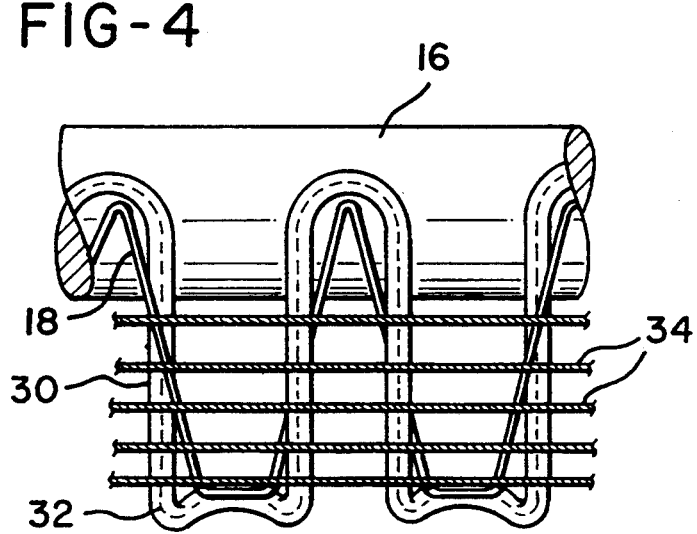
FIG-4A
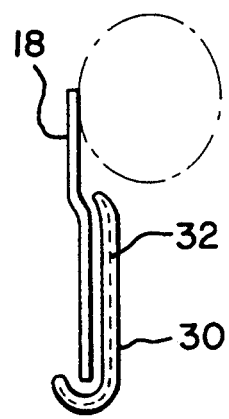

APPARATUS FOR SUPPORTING A GLASS SHEET DURING A TEMPERING PROCESS

BACKGROUND OF THE INVENTION

The present invention relates to an apparatus for supporting a glass sheet during a tempering process, and more particularly, to an apparatus which supports and cushions the glass sheet during a tempering process without adversely affecting the optical qualities of the resulting tempered glass.

Various apparatus and devices for supporting hot glass sheets during a tempering process are known in the art. One such device comprises a ring-type mold made of rigid metal that includes an outline upper surface shaped to conform to the shape desired slightly inward of the outline of the glass sheet. Typically, a glass sheet is heated in a furnace to its softening point, and then either pressed to shape between complementary molds and transferred to the ring-type mold, or sagged by heat and gravity to the shape provided by the shaping surface of the mold.

After the glass sheet is shaped, it is transferred while supported on the ring to a quenching station where it is quenched rapidly by applying cold air blasts against the upper and lower surfaces of the glass sheet. Such a tempering process greatly increases the mechanical strength of the glass and its resistance to breakage. Further, when fractured, tempered glass tends to break into relatively small, smooth pieces rather than large, jagged fragments.

However, the ring-type mold that supports the glass sheet as it is transferred between the shaping station and the quenching station is alternately exposed to the hot temperature of the furnace and to the lower temperature provided by cold blasts of air at the quenching station. When a shaped glass sheet contacts the hot, heavy metal ring during this rapid cooling, glass breakage can result at the glass-metal contact areas due to the difference in heat conductivity between the glass sheet and the metal ring.

Further, when the heat-softened glass comes into direct contact with the rigid ring, slight blemishes or variations from the shape desired become obvious on the surface of the shaped glass, These blemishes disrupt the optical properties of the shaped glass.

Accordingly, there have been attempts to eliminate these problems by avoiding direct contact of the glass sheet with the metal ring, thus preventing excessive heat transfer which may cause cracking. For example, McMaster, U.S. Pat. No. 3,586,492, and Seymour, U.S. Pat. No. 3,741,743 disclose an endless ring frame for supporting a glass sheet having a plurality of teeth around the frame which are covered with a wire mesh screen to minimize contact of the ring with the glass sheet. In Seymour the wire mesh screen includes a heavy wire mesh supported on the ring and a fine wire mesh that contacts the glass sheet. In other applications, a wire mesh cloth has been used to cushion the glass and minimize contact with the ring. However, in order to provide the desired cushion for the glass sheet, many layers of mesh are required, which not only adds expense but also decreases the quench air flow to the glass. Further, mesh cloth is typically not very durable, and must be replaced frequently.

Yamada et al, U.S. Pat. No. 4,749,399 describes an apparatus for shaping a curved tempered glass sheet including a cooling ring mold covered with a punched metal strip having a number of openings to improve quench air flow and to prevent the cooling ring from coming into direct contact with the glass. However, such a metal strip is often difficult to fit on frames.

Accordingly, there is still a need in the art for an apparatus for supporting a glass sheet during a tempering process which provides increased cushioning of the glass without restricting quench air flow, and without adversely affecting the optical quality of the glass.

SUMMARY OF THE INVENTION

The present invention meets those needs by providing an apparatus for supporting a hot glass sheet during a tempering process which provides durable, inexpensive cushioning means, improved quench air flow, and high optical quality.

According to one aspect of the present invention, an apparatus for supporting a hot glass sheet during transport from a furnace to an air quench area during a tempering process is provided. The apparatus preferably comprises a truss ring structure adapted to engage a glass sheet. The truss ring structure has a hot/cold ring and a plurality of shaped fingers having converging diagonal sides extending radially inward from the hot/cold ring for supporting the glass sheet. Preferably, there are bridges between the finger tips of the shaped fingers. The apparatus preferably includes a shuttle frame for transporting the truss ring structure out of the furnace and into the air quench area.

The apparatus also preferably includes means for cushioning the glass sheet on the truss ring structure comprising at least one layer of composite mesh cloth folded around the shaped fingers of the truss ring structure. The composite mesh cloth comprises high density and low density stainless steel mesh. Preferably, the composite mesh cloth is arranged on the shaped fingers extending from the hot/cold ring such that the low density mesh contacts the hot/cold ring and the high density mesh contacts the glass sheet. This arrangement provides optimum quench air flow to the glass.

Further cushioning means may be provided by a fiberglass tube which comprises a tube formed into a pattern of interconnected "W", "U", or "S" shapes having a core selected from the group consisting of silicone, ceramic, and fiberglass materials. The use of a fiberglass tube helps to regulate the level of cushion to the glass and also minimizes glass distortion. In a preferred embodiment, the fiberglass tube is positioned on the shaped fingers extending from the hot/cold ring and the composite mesh cloth is folded around the fiberglass tube and the fingers such that both the fiberglass tube and the fingers are covered with the composite mesh cloth.

In yet another embodiment of the invention, the apparatus comprises a hot/cold ring and a plurality of spaced apart fingers extending radially inward from the hot/cold ring, a shuttle frame for transporting the hot/cold ring, and means for cushioning the glass sheet on the hot/cold ring comprising a fiberglass tube positioned on the fingers. Preferably, the cushioning means further includes a perforated stainless steel mesh.

Accordingly, it is an object of the present invention to provide an apparatus for supporting a glass sheet in which the glass sheet is cushioned so as to provide optimum quench air flow as well as improve the optical quality of the glass.

These, and other objects and advantages of the present invention will become apparent from the following detailed description, the accompanying drawings, and the appended claims.

BRIEF DESCRIPTION OF THE DRAWINGS

FIG. 1 is a perspective view of the apparatus for supporting a glass sheet according to the present invention;

FIG. 2 is an enlarged sectional view of the truss ring structure shown in FIG. 1;

FIG. 3 illustrates the composite mesh cloth of the present invention;

FIG. 3A is a side view of FIG. 2 illustrating the use of the composite mesh cloth of the present invention;

FIG. 4 is a sectional view of FIG. 1 illustrating the fiberglass tube;

FIG. 4A is a side view of FIG. 4;

DETAILED DESCRIPTION OF THE PREFERRED EMBODIMENTS

Figure 5:
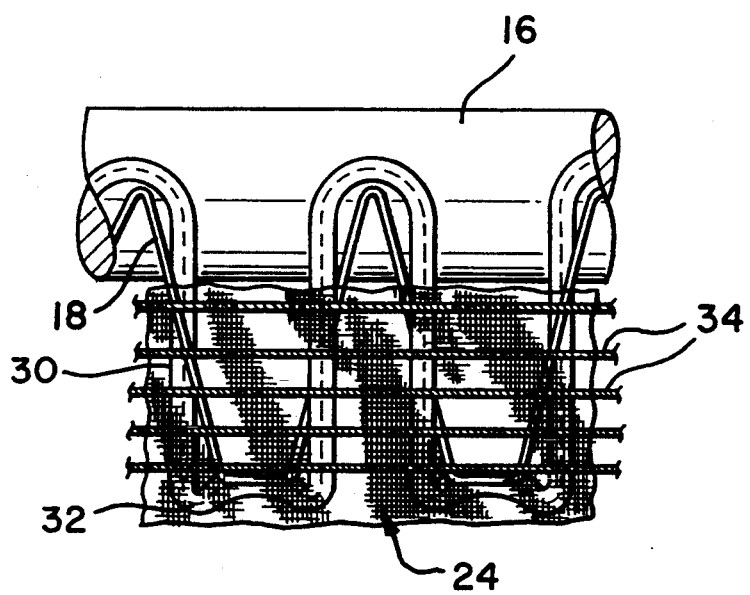
FIG. 5 is a sectional view of a preferred embodiment of the invention.

Referring now to FIG. 1, the apparatus 10 of the present invention is illustrated. The apparatus comprises a truss ring structure 12 for engaging a glass sheet 14. The truss ring structure is supported on a shuttle frame 20 which transports the structure from the furnace to the air quench area in a tempering process.

As shown in detail in FIG. 2, the truss ring structure 12 has a hot/cold ring 16 made preferably of stainless steel 302/304 having a thickness of approximately ⅛ inch material and a plurality of shaped fingers 18 made of the same thickness material and having converging diagonal sides 19 extending radially inward from the hot/cold ring for supporting the glass sheet 14. Because the truss structure uses shaped fingers rather than parallel fingers as in many prior art structures, the resulting glass has better optics because the weight of the glass is more evenly supported. The truss ring structure also eliminates the problem of pie crusting (glass distortion) which often results from use of parallel ring fingers. The truss structure also uses fingers of smaller width, so there is greater quench air flow to the glass. Preferably, the finger tips of the fingers are about 5/16 inch wide and the bases of the fingers are about ⅜ inch wide. As a result, the truss ring structure has a quench break of only about 4.9% as compared to prior art structures which have a quench break of about 14.4% for a particular part and particular tempering process. The truss ring structure also includes bridges 21 between the finger tips 22 of the shaped fingers. The bridges are preferably about ⅛ inch wide, 1/6 inch thick, of stainless steel 302/304. The bridges in the truss prevent pieces of broken glass caught in the lower quench area from damaging the composite mesh cloth during ring oscillation, which frequently occurs during the tempering process. Thus, the problem of thermal leads is also reduced as damaged cloth is known to induce thermal leads and result in poor optical quality.

Also as shown in FIG. 2, the apparatus includes means for cushioning the glass sheet on the truss ring structure comprising at least one layer of composite mesh cloth 24. The composite mesh cloth is shown in detail in FIG. 3. The composite mesh cloth is preferably knitted from hard stainless steel with optimum wire diameter of 0.008 inch to 0.011 inch into two different mesh openings, namely high density stainless steel mesh 26 and low density stainless steel mesh 28. For the purposes of this invention, high density mesh is defined as a tightly woven mesh having 9 to 11 openings per linear inch and low density mesh is defined as a loosely woven mesh having 1 to 2 openings per linear inch.

The composite mesh cloth is preferably arranged in layers and may be folded along lines 6—6 around the shaped fingers of the ring structure as shown in FIG. 3A. As shown, the mesh is preferably arranged such that the low density mesh 28 contacts the fingers 18 of the truss ring structure and the high density mesh 26 contacts the edge of the glass sheet 14. The high density mesh in contact with the glass sheet improves the optical quality of the glass and the low density mesh in contact with the hot/cold ring tempers the glass and allows more quench air flow to the glass. This results in tempered glass having higher edge and surface compression. Using the composite mesh cloth of the present invention achieves an edge compression value of 5700 psi. This represents a 400–500% improvement over the prior art, which achieves about 1000 psi in a critical peripheral region for a particular part and particular tempering process. Further, because the use of a composite mesh cloth allows greater air flow, the number of layers required for effective cushioning is reduced. For example, four layers of composite mesh cloth have been found to be more effective than using 20 layers of uniform mesh cloth.

Referring now to FIGS. 4 and 4A, the truss ring structure may further include a fiberglass tube 30 for providing additional cushioning means. The fiberglass tube comprises a tube 32 having a 0.040 inch to 0.060 inch outer diameter and an inner diameter the same as the core, which is selected from the group consisting of silicone, ceramic, and fiberglass materials. As shown, the fiberglass tube is preferably formed in a of interconnected "W", "U" or "S" shapes pattern, and thin stainless steel wire 34 is used to stitch the tube. The diameter and the number of cores in the fiberglass tube function to regulate the level of cushion to minimize the problem of pie-crusting (glass distortion). Thus, 3 to 5 cores having a diameter of 0.020 inch to 0.030 inch are preferred. The fiberglass tube is preferably from about 1.5 to 2.5 inches wide. FIG. 4A illustrates a side view of the fiberglass tube 30 positioned on one of the truss ring fingers 18 of the truss ring structure.

The use of fiberglass tube results in significant reduction of filler materials, and thus may be used in place of existing prior art dense filler materials. The fiberglass tube also provides low thermal conductivity, low tension imbalance near the glass edge, and improves the optical quality of the glass by increasing cushion without restricting the quench air flow. When the fiberglass tube is used in combination with the composite mesh cloth, only one layer of mesh cloth is required between the tube and the glass. This arrangement improves the durability of the tube. The durability of the tube may be further enhanced by knitting or braiding the fiberglass tube with a stainless steel wire 34 made of 0.005 inch diameter soft 304 or 316 stainless steel. The opening of the braiding or knitting on the fiberglass tube is preferably about 40-60%.

Figure 5A:
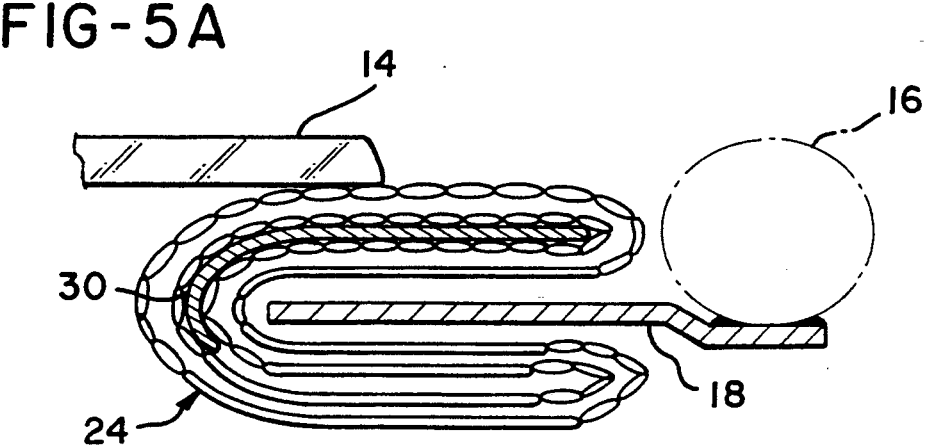
FIG. 5A is a side view of FIG. 5.

A preferred embodiment of the invention is illustrated in FIG. 5, in which the composite mesh cloth 24 is folded around the fiberglass tube 30 and the shaped fingers 18 such that the fiberglass tube and the fingers are covered with the composite mesh cloth. FIG. 5A illustrates a side view of this arrangement in which the fiberglass tube 30 is mounted on the ring fingers 18 and the composite mesh cloth 24 is folded around the fingers such that the fiberglass tube is covered with the composite mesh cloth.

Figure 6:
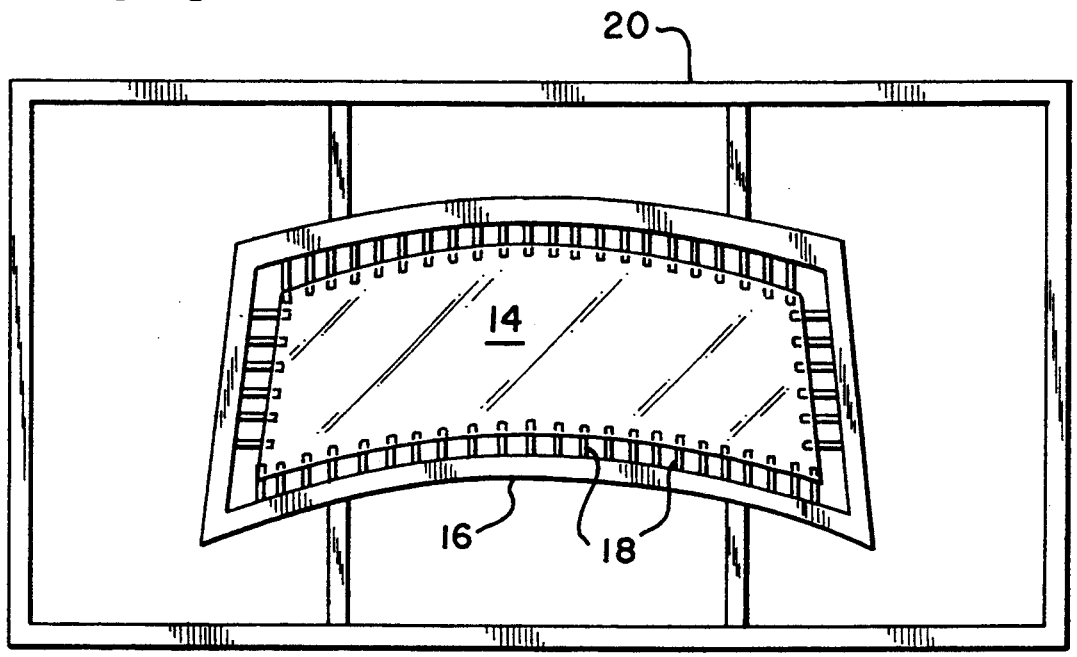
FIG. 6 is a perspective view of an alternative embodiment of the invention.
Figure 7:
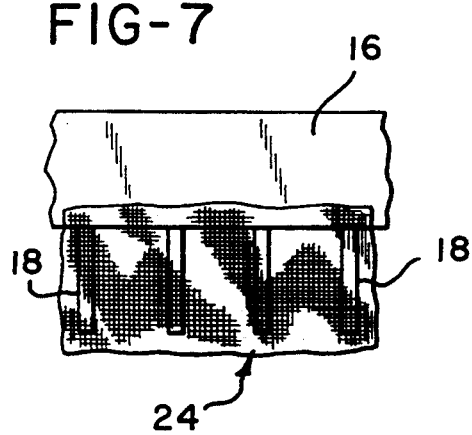
FIG. 7 is an enlarged sectional view of the embodiment shown in FIG. 6.
Figure 7A:
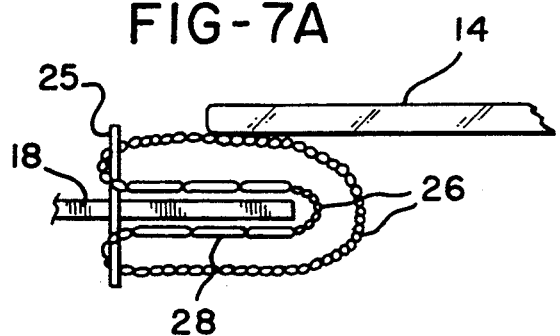
FIGS. 7A and 7B are side views of the embodiment shown in FIG. 7.
Figure 7B:
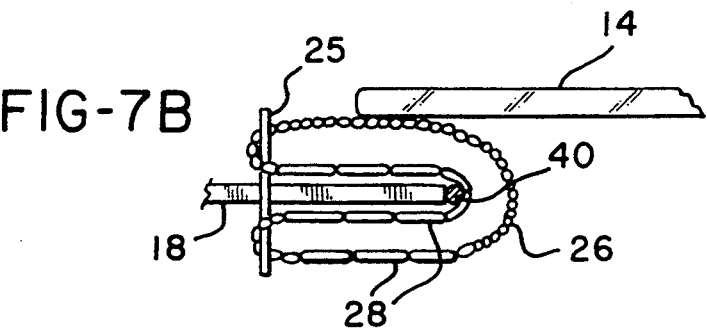

FIG. 6 illustrates another embodiment of the invention in which the apparatus comprises a hot/cold ring 16 and a plurality of spaced apart fingers 18 for supporting the glass sheet 14. The apparatus also includes a shuttle frame 20 for transporting the glass. As shown in FIG. 7, means for cushioning the glass sheet comprises at least one layer of composite mesh cloth 24 folded around the fingers 18 extending from the hot/cold ring and held in place by tie 25. FIGS. 7A and 7B illustrate two possible arrangements of the composite mesh cloth. A preferred arrangement is shown in FIG. 7A where the high density mesh 26 contacts the tips of the fingers 18 extending from the hot/cold ring, which prevents the fingers from puncturing through the mesh. However, it is also possible to use low density mesh 28 at the finger tip as shown in FIG. 7B when a small bridge 40 is used at the finger tips.

Figure 8:
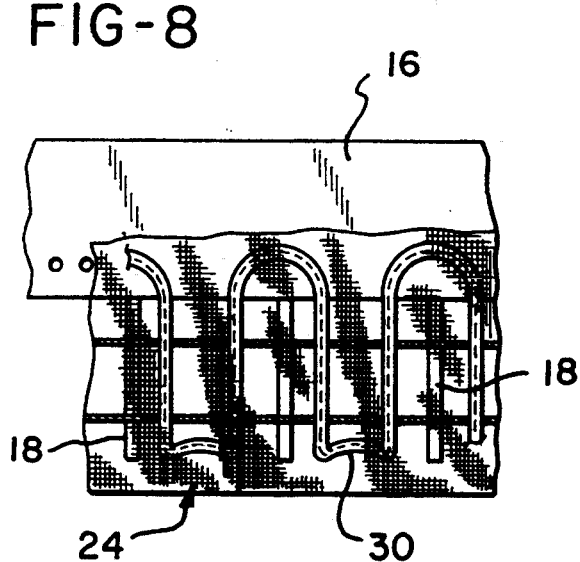
FIGS. 8 and 8A are top and side views, respectively, of one arrangement of the fiberglass tube.
Figure 8A:
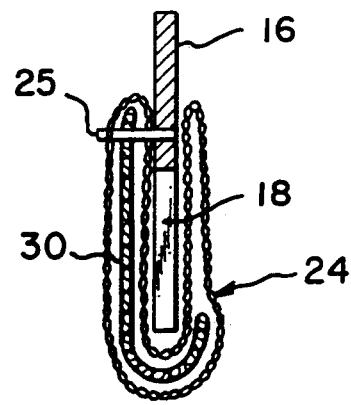
Figure 9:
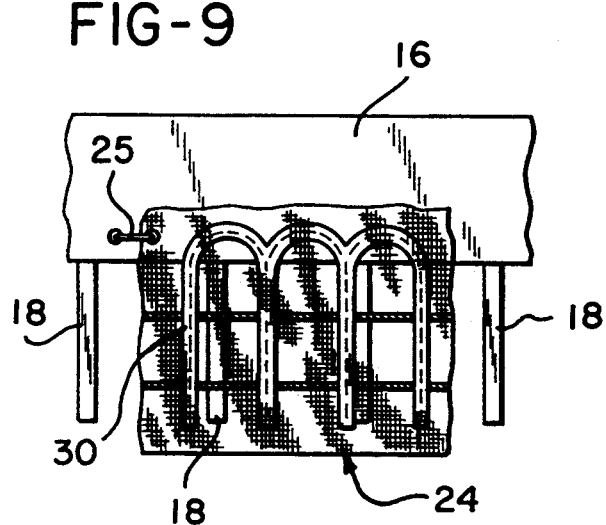
FIGS. 9 and 9A are top and side views, respectively, of an alternative arrangement of the fiberglass tube.
Figure 9A:
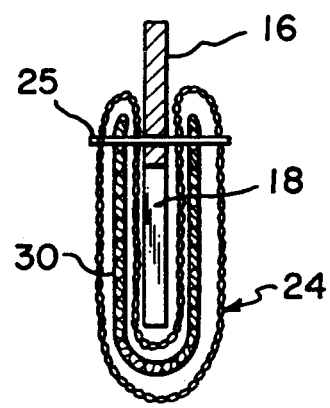

The apparatus may further include the use of a fiberglass tube 30 as shown in FIGS. 8 and 8A. As shown, the composite mesh cloth 24 is preferably folded around the fiberglass tube 30 and the fingers 18 such that the fiberglass tube and the fingers are covered with the composite mesh cloth. An alternative arrangement of the fiberglass tube on the fingers is shown in FIGS. 9 and 9A.

Figure 10:
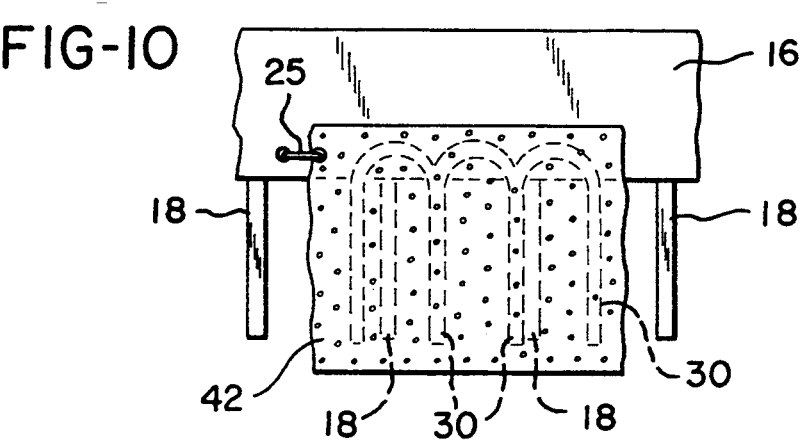
FIG. 10 is an enlarged sectional view of another alternative embodiment of the invention.

In another alternative embodiment of the invention, the apparatus comprises a hot/cold ring and a plurality of spaced apart fingers extending inward from the hot/cold ring as shown in FIG. 6. As shown in FIG. 10, means for cushioning the glass sheet comprises a fiberglass tube positioned on the fingers. Preferably, the means for cushioning further includes perforated stainless steel mesh 42.

In order that the invention may be more readily understood, reference is made to the following examples, which are intended to be illustrative of the invention, but are not intended to be limiting in scope.

EXAMPLE

The study in this example was conducted to compare the performance of the truss ring structure and composite mesh cloth with a typical prior art ring and uniform mesh. The results are shown below in Table I.

TABLE I

|  | Prior art ring and uniform mesh | Truss ring and composite mesh |
| --- | --- | --- |
| Susceptibility to spontaneous breakage determined by tension imbalance (measured by Stress Analyzer) | 1908 psi (Plant A) 7200 psi (Plant B) 6160 psi (Plant C) (on best to worst scale of 0 to 8000 psi) | 874 psi (Plant A) 3100 psi (Plant B) 3780 psi (Plant C) |
| Optical Quality evaluated by the D-Sight Analyzer | 2 (on best to worst scale of 1 to 10) | 1 |
| Life Span of the ring cover mesh (Plant A) | 1000 parts to a few thousand parts* | Minimum of 2200 parts (unit replaced after 2200 parts due to other reasons) |
| Glass scratches | Yes | None |
| Quench Breaks (blow-ups) (difficult to temper due to small operating window) | 14.4% | 4.9% |
| Susceptibility to spontaneous breakage determined by tension regions (length) | 30-35 inches (on best to worst scale of 0 to entire part periphery) | 4-6 inches |

*The roof edge of the ring cover mesh for a particular difficult, large part may have a life span of 1000 parts, while the pillar and cowl edges of the ring cover mesh may have a life span of a few thousand parts.

The fewer number of quench breaks which occurred with the present invention indicate that thermal leads which are known as a cause of spontaneous breakage are reduced. It was noted that the combination of the truss ring and composite mesh cloth reduced the tension imbalance by 54% as opposed to a 25% reduction shown by the prior art ring in combination with the composite mesh cloth.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An apparatus for supporting a hot glass sheet during transport from a furnace into an air quench area during a tempering process comprising:
    a truss ring structure adapted to engage a glass sheet, said truss ring structure having a ring and a plurality of shaped fingers having converging diagonal sides connected to and extending radially inward from said ring for supporting the glass sheet;
    a shuttle frame for transporting said truss ring structure; and,
    means for cushioning the glass sheet on said ring, said means comprising a fiberglass tube positioned on said fingers.

2. The apparatus of claim 1 wherein said truss ring structure includes bridges between the finger tips of said shaped fingers.

3. The apparatus of claim 2 wherein the finger tips of said shaped fingers are about 5/16 inch wide and the bases of said shaped fingers are about ¾ inch wide.

4. The apparatus of claim 1 wherein said means for cushioning the glass sheet on said truss ring structure further comprises at least one layer of composite mesh cloth folded around both said shaped fingers of said truss ring structure and said fiberglass tube positioned on said fingers.

5. The apparatus of claim 4 wherein said layer of composite mesh cloth comprises high density and low density stainless steel mesh.

6. The apparatus of claim 5 wherein said low density mesh contacts said shaped fingers of said truss ring structure and said high density mesh contacts said fiberglass tube positioned on said fingers and the glass sheets.

7. The apparatus of claim 4 wherein said layer of composite mesh cloth is folded around said fiberglass tube and said shaped fingers such that said fiberglass tube and said shaped fingers are covered with said layer of composite mesh cloth.

8. The apparatus of claim 7 wherein said fiberglass tube is formed into a interconnected "W", "U" or "S" shaped pattern and having a core selected from the group consisting of silicone, ceramic, and fiberglass materials.

9. An apparatus for supporting a hot glass sheet during transport from a furnace into an air quench area during a tempering process comprising:
   a ring adapted to engage a glass sheet and a plurality of shaped fingers connected to and extending radially inward from said ring for supporting the glass sheet;
   a shuttle frame for transporting said ring; and
   means for cushioning the glass sheet on said ring, said means comprising a patterned fiberglass tube positioned on said fingers.

10. The apparatus of claim 9 wherein said fiberglass tube is formed into a interconnected "W", "U" or "S" shaped pattern and having a core selected from the group consisting of silicone, ceramic, and fiberglass materials.

11. The apparatus of claim 10 wherein said fiberglass tube is from about 1.5 to 2.5 inches wide.

12. The apparatus of claim 9 wherein said means for cushioning further a perforated stainless steel mesh folded around both said shaped fingers of said truss ring structure and said fiberglass tube positioned on said fingers.

13. The apparatus of claim 9 wherein said means for cushioning further includes a composite mesh cloth folded around both said shaped fingers of said truss ring structure and said fiberglass tube positioned on said fingers.

14. An apparatus for supporting a hot glass sheet during transport from a furnace into an air quench area during a tempering process comprising:
   a truss ring structure adapted to engage a glass sheet, said truss ring structure having a ring and a plurality of shaped fingers having converging diagonal sides connected to and extending radially inward from said ring for supporting the glass sheet,
   a shuttle frame for transporting said truss ring structure, and
   means for cushioning the glass sheet on said truss ring structure, said means comprising a fiberglass tube positioned on said fingers and at least one layer of composite mesh cloth folded around said fiberglass tube and said shaped fingers such that said fiberglass tube and said shaped fingers are covered with said layer of composite mesh cloth.

15. The apparatus of claim 14 wherein said truss ring structure includes bridges between the finger tips of said shaped fingers.

16. The apparatus of claim 15 wherein said fiberglass tube is formed into a interconnected "W", "U" or "S" shaped pattern and having a core selected from the group consisting of silicone, ceramic, and fiberglass materials.

17. The apparatus of claim 15 wherein said layer of composite mesh cloth comprises high density and low density stainless steel mesh.

18. The apparatus of claim 17 wherein said low density mesh contacts said shaped fingers of said truss ring structure and said high density mesh contacts said fiberglass tube positioned on said fingers and the glass sheets.

19. A truss ring structure for supporting a glass sheet during transport from furnace into an air quench area during a tempering process comprising a ring, a plurality of shaped fingers having converging diagonal sides connected to and extending radially inward from said ring, and a fiberglass tube positioned on said fingers for cushioning the glass sheet on said ring.

20. The truss ring structure of claim 19 including bridges between the finger tips of said shaped fingers.

21. The truss ring structure of claim 20 wherein said finger tips of said shaped fingers are about 5/16 inch wide and the bases of said shapes fingers are about $\frac{3}{4}$ inch wide.

* * * * *